July 3, 1945.  R. G. TYLER  2,379,554
METHOD OF TREATING SEWAGE
Filed Oct. 1, 1941
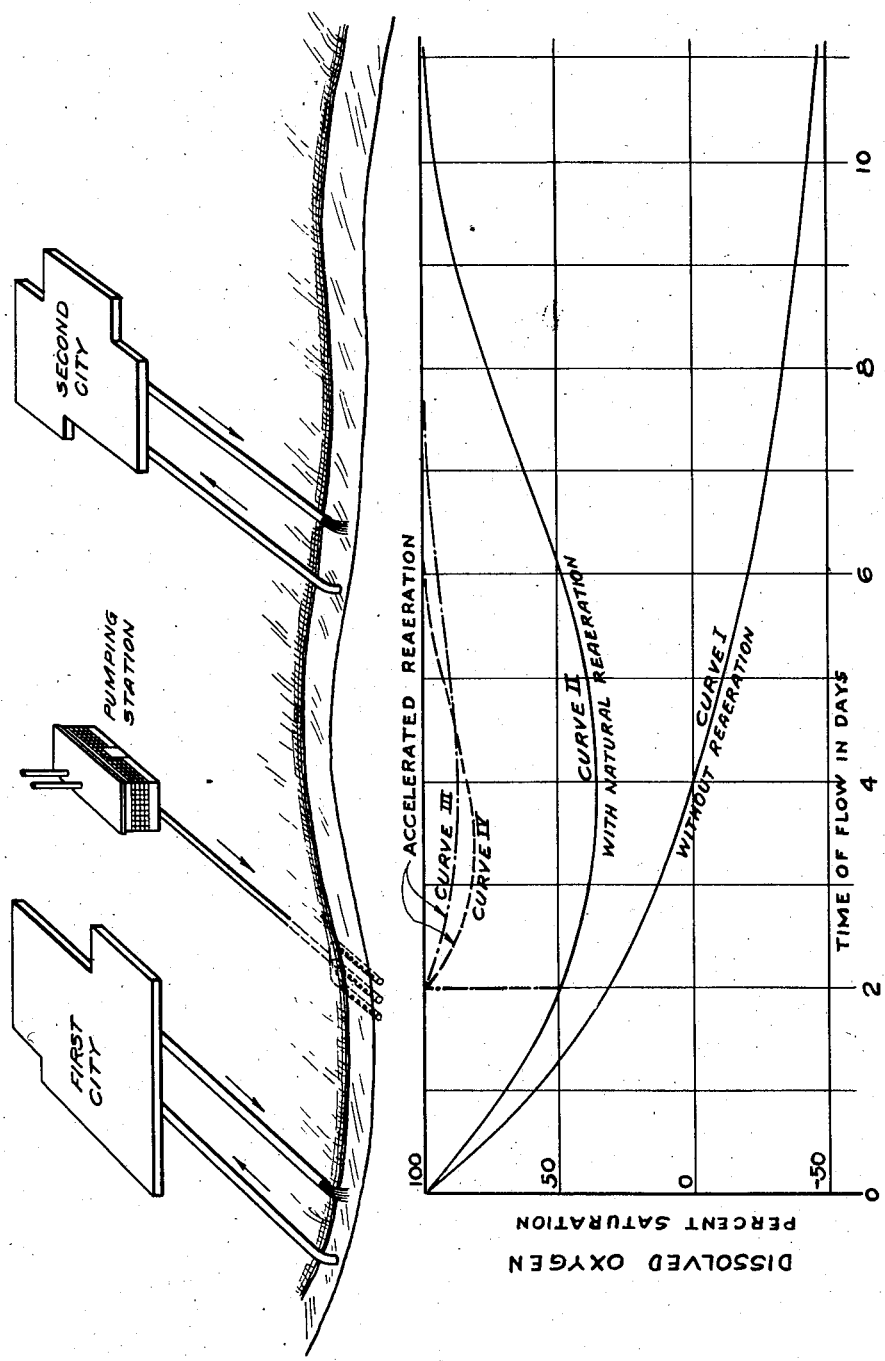
INVENTOR
Richard G. Tyler
BY Paul Bliven
ATTORNEY Patented July 3, 1945

2,379,554

UNITED STATES PATENT OFFICE 2,379,554

METHOD OF TREATING SEWAGE

Richard G. Tyler, Seattle, Wash.

Application October 1, 1941, Serial No. 413,150

3 Claims. (Cl. 210—2)

The present invention relates to a method of treating sewage. In more particular the present invention relates to a method of accelerated re-aeration for controlling the condition of a natural water course receiving decomposing waste products when they have been emptied into a natural water course, until the decomposition is sufficiently complete to allow the natural use of the stream to take place.

The natural and usual method of disposing of sewage and industrial wastes is to discharge them into streams, lakes, or tidal waters. Sometimes these wastes are thus discharged raw or without treatment of any kind. At other times, some of the various methods of treatment known to sanitary engineers may be used to decrease the pollutional load placed upon the stream or other receiving waters. In either case, the final method of disposal is to discharge the treated or untreated waste material into the natural water course, where the water itself during its natural flow, is called upon to complete the task of oxidizing the contained organic matter and transport the waste away from the community where it was produced to an ultimate place of disposal in some ocean or lake. In a few cases, the sewage has been distributed over the soil as irrigation water.

Organic solids render sewage putrescible. Biological decomposition, i. e., the utilization by microorganisms of the food materials contained in sewage, changes the unstable organic matter into mineral or relatively stable organic substances. The processes of decomposition, however, take a long time for completion and are accompanied by the production of offensive odors and other objectionable features unless they are accelerated and controlled in biological treatment works or unless the receiving waters are large in volume. Biological treatment of sewage, furthermore, removes finely divided and dissolved matter from the sewage by contact processes.

All living things are dependent upon oxygen for respiration. Gaseous oxygen furnishes the normal needs. Aquatic environment is inherently sensitive to the oxygen demands of the organisms that populate it. The food materials contained in sewage encourage the growth of myriads of living organisms, and their respiratory requirements quickly diminish the oxygen dissolved in the sewage or diluting waters, unless the supply is replenished by natural or artificial means. If the dissolved oxygen becomes exhausted, those (aerobic) organisms that are not capable of utilizing oxygen from sources other than dissolved, or free, oxygen succumb. Their place is taken by (anerobic or facultative anerobic) organisms that can draw upon the oxygen contained in organic matter and in substances such as nitrates, nitrites, and sulphates.

In very large receiving waters, however, anerobic decomposition of sludge deposits may proceed without objection so long as aerobic conditions are maintained in the water itself and the sludge is not buoyed up by excessive release of sludge gases to form floating islands of sludge on the water surface.

The anerobic decomposition of sewage is called sludge digestion, and, as pointed out above, may be carried out simultaneously with the aerobic decomposition. The process of treatment called the "activated-sludge treatment" is dependent upon aerobic decomposition, but it is recognized that if such treatment is incomplete it may be followed by anerobic treatment. This anerobic treatment may extend over a period of weeks and even months as compared to a well regulated activated-sludge process requiring only a matter of a few hours.

A stream that may be only slightly deficient in dissolved oxygen in its surface waters, may be deficient in dissolved oxygen in its bottom waters and in the sludge lying on the bottom.

Many of the ingredients of normal sludge have their constituent oxygen loosely linked in chemical combination. When this loosely held oxygen has been removed by the anerobic action, the resulting product may be considered as a catalyst that will readily take up dissolved oxygen from the water and pass it on to the anerobes upon demand. When anerobic action is thusly considered, it becomes important to maintain a certain concentration of dissolved oxygen in the stream for optimum digestion. In the disposal of waste sulfite liquor from pulp mills, the action is partly that of the calcium sulfite being oxidized by the action of the dissolved monatomic-oxygen to a sulfate, followed by the fermentation of the sugars present, and the use of this loosely linked oxygen by the anerobes in their life process as they digest portions of the waste present in the stream. The importance of a rapid disposal of sulfite waste may be realized from the fact that the refuse from a hundred ton pulp mill is considered equal to that from a city of 200,000 people.

When treated or untreated sewage or other wastes are discharged into a naturally flowing water course, the organic matter is broken down over a period of time, through biochemical processes forming inert chemicals or inorganic compounds which no longer produce nuisances. In this process, oxygen is absorbed from the water, but if the oxygen supply is too greatly depleted, nuisances will be formed, foul odors produced, and the natural fish life may be destroyed. This oxygen consuming load of sewage on receiving waters is measured by the biochemical oxygen demand (BOD) test as specified by the American Public Health Association. This is the standard method of designating the pollutional load of sewage or wastes on streams or treatment plants, currently used by sanitarians in the fields of water supplies and sewage treatment. The purpose of sewage treatment in sewage disposal plants is primarily to remove or reduce this oxygen demand along with suspended solids and such harmful or pathogenic bacteria as may be present.

The reduction of the BOD depends upon temperature, number of bacteria present, dissolved oxygen of the water, bacterial food supply, acidity or pH, of the water, and various other factors. Normally, in a water course after pollution it requires several weeks for the removal of the BOD to a point where further decomposition is of negligible proportions. This process uses up the dissolved oxygen present in the water, and is known as the deoxygenation of a stream.

At the same time, a natural process of reaeration of the stream goes on, which is the absorption of oxygen from the air or from water plants, which will gradually replenish the depleted oxygen supply until the water again becomes saturated or contains as much oxygen as it can absorb at its given temperature and mineral content. This rate of aeration of water varies with temperature, degree of oxygen depletion, area of intersurface contact, turbulence, and other less important factors. If oxygen can be absorbed as rapidly as it is used up, nuisances will not be formed and fish life will not be interfered with, assuming that no toxic materials are present (this is true except with a very few wastes containing chemicals harmful to fish life).

The BOD of a water course is usually correlated with the dissolved oxygen concentration (DO) or oxygen deficiency by means of a straight line function. The oxygen deficiency of a polluted stream is the amount by which the dissolved oxygen falls below the saturation value at the given temperature, and it varies along the course so that the point of maximum deficiency may be several days flow below the source of pollution in point of travel of the stream. The relative distance of this point of maximum oxygen deficiency below the sewer outlet and the amount of the deficiency varies with the various factors heretofore mentioned.

It is also to be noted that the rate of deoxygenation is greater with increased dissolved oxygen, being greatest at saturation, and that the rate of reaeration is also changed. The net result is a more rapid oxidizing of the pollutional load, at the higher oxygen concentrations.

All of the prior art devices and processes for the treatment of sewage have been devised for manipulation of the sewage at the time of or prior to its placement in the water course. Thus they have failed to aid the natural action or condition of the water course by supplementing its oxygen supply. If this oxygen supply were to be supplemented, then as will be understood from the previous discussion, both the aerobic and the anerobic action will be increased, the natural fish life of the stream will be preserved, and the oxygen content of the stream raised to a point where the water of the stream may again be put to the use of sanitation and other purposes. This supplementing of the oxygen supply of the stream might progress, and probably would, to a point where anerobic action would be materially reduced, but this reduction of anerobic action would only result in a desirable increase in the aerobic action.

Having in mind these natural processes and these defects of the prior art, it is an object of the present invention to aid the natural action of a water course in the oxygenation of its sewage load by supplying it with oxygen at any desired point along its course.

Another object of the present invention is the bubbling of air up thru a naturally flowing water course to prevent or remove an oxygen deficiency.

Another object of the present invention is the aeration by any means whatsoever, of naturally flowing water courses into which sewage has been discharged, in sufficient amount to prevent or remove an oxygen deficiency.

A further object of the present invention is the mechanical agitation of all or part of a naturally flowing water course to increase the oxygen content and aid in the decomposition of sewage contained therein.

A further object of the present invention is the oxygenation of a naturally flowing water course carrying sewage, at or near its point of maximum oxygen deficiency.

A further object of the present invention is the aeration of any naturally flowing water prior to or after its pollution, at any desired or convenient point or points, above or below the point of pollution, by any form of bubble, mechanical, or other method of aeration, for the purpose of replenishing the dissolved oxygen supply of the water course, which either has been or is being used up by the chemical or biochemical changes that are occurring in the organic or inorganic content of the water, sewage, or industrial wastes.

Another object of the present invention is the addition of and mixing with a water course of oxygen carrying froths or other materials containing available oxygen, to prevent oxygen deficiency.

When a survey has been made and it has been determined that an oxygen deficiency exists in a stream, and a graph has been made of that deficiency as related to time of flow or length of flow in the stream, the aforementioned deficiencies are remedied and objects attained by adding air to the stream at or prior to the place of maximum deficiency. This may be done by any one of several methods such as direct aeration, mechanical agitation, or the addition of froth.

As will be apparent from the hereinafter disclosure, these objects and others are attained, and these defects remedied by means of the devices, construction, and process shown in the accompanying drawing, wherein:

The figure is a schematic drawing of a typical water course; cities or other pollutional sources spaced along such a course with their intervening distances measured in days of flow of the water course; an aerating station along the course; and a graph with four curves, each showing the dissolved oxygen deficiency along the course, expressed in percent of saturation, for an assumed pollutional load for the water course.

Curve I shows the deficiency that would exist if no reaeration, not even natural, were to take place.

Curve II shows the dissolved oxygen with natural reaeration.

Curve III expresses the effect of accelerated reaeration without any change in the rates of deoxygenation or reaeration due to such accelerated reaeration.

Curve IV gives the result of the accelerated reaeration, and shows the effect on the reactions of the increased percent DO saturation.

In the drawing, the water course flows from left to right across the top of the figure. Prior to the discharge of the sewer from the first city, assume that the BOD of the course is zero, and there is no oxygen deficiency. In the natural course of flow the oxygen deficiency would rapidly increase for the assumed conditions, for a period of two days from the sewer outlet, and at three days the deficiency reaches a maximum of ten parts per million, or thirty-five percent saturation. This is shown by the curve II of the graph. This curve is also known as the oxygen sag curve. In the natural course of events, it would take this stream ten days to clear itself of organic sewage under the assumed conditions.

In the illustrated problem this time of ten days would take the stream past another city which desires to discharge its sewage into the water of the stream but cannot because its oxygen supply is already depleted by the organic sewage content. The present invention may be practiced to remedy this condition. In the drawing the invention is shown as providing an aerating station which pumps air thru pipes to one or more sets of porous plates or aerators laid on and across the bottom of the stream at a point about two days travel from the point of sewage inlet and at a place prior to the point of maximum oxygen deficiency without aeration. These aerators may be made out of perforated pipe, porous plates, or other mechanical means of forcing air into the water. The pipe or plates may be overlaid with a timber or other type of grillage to increase the dispersion or to retain the air for a longer time in the water. Any suitable air pumps or blowers may be employed for producing a supply of compressed air for passage thru the aerators.

The result of this aeration is shown in the drawing by curve IV of the graph. From this line it will be perceived that the oxygen deficiency abruptly decreases to any desired amount as a result of the aeration, then sags again as the remaining organic matter is oxidized, but not to as low a point as without aeration, and returns to normal at the end of about six days from the time of pollution, before the water reaches the other city.

Curve I is not representative of actual stream conditions but represents the dissolved oxygen without natural or artificial reaeration. The negative DO condition represents loss of combined oxygen, which takes place with exclusive anerobic action. The difference between curve I and curve II shows the great gain that can be effected by taking advantage of the action of naturally flowing streams for complete or partial sewage disposal.

Curve III, also, is not representative of actual stream conditions, even with accelerated reaeration. There is a greater rate of deoxygenation at the higher saturation levels. This is represented in curve IV.

The difference between curve II, and curves III and IV shows the further great gain that can be effected by the use of accelerated reaeration. In fact, by increasing the points at which accelerated reaeration is applied the difference can be further increased.

In a lake which has a relatively slow water motion the spread of sewage takes place over a period of time. The distance traveled may not be as great as in a stream or in tidal waters, but even so, time and distance may be plotted against the biochemical oxygen deficiency, and steps may be taken to reduce such a deficiency by supplying air to the lake waters. This might be done by supplying the air at the sewer outlet or at points of greatest oxygen deficiency.

In this practice of the present invention the air may be supplied at one or more points along the water course. The amount of air supplied at any one point need not be sufficient to reduce the oxygen deficiency to zero, but may be undertaken with the view of maintaining the dissolved oxygen at or near a constant or desired value, such as the minimum dissolved oxygen allowed by the state law of the state in which the water course is located. The air may be placed in the water by means other than bubbling it thru the water. The air may be whipped into the water by any agitating means, including all those devices used for mechanical aeration in the activated sludge method of sewage treatment, or by the use of such mechanical devices as spray nozzles, baffles, riffles, weirs, hydraulic jumps, etc. The air may be placed in the water by means of a froth produced by the use of frothing agents or even by the frothing of the waste itself prior to its disposal in the water course. The air may be supplied to all or part of the receiving waters, either at the point of maximum oxygen deficiency, at the sewer outlet, or at any desired distance below it, or it may be applied in increments at any desired number of points so as to supply the oxygen more nearly as it is being used up.

The above disclosed method and apparatus may be used either to supplement a conventional sewage disposal plant or it may be used as a complete process for the treatment of sewage in the receiving waters.

The above disclosed method and apparatus for the aeration of sewage receiving waters may be used as a complete process of sewage, waste, or disposal plant effluent treatment, or it may be used in connection with any method of partial or complete sewage or waste treatment. Also, it may be used to improve the condition of any stream, lake, or tidal waters whose oxygen supply has been depleted from any cause in any amount.

The use of the letters "BOD" is an abbreviation of the phrase, biochemical oxygen demand.

The use of the phrase "water course" refers to the movement of waters in lakes, rivers, streams, harbors, bays, etc.

The use of the phrase "the natural flow of a water course" or "a naturally flowing water course" is used to designate a water course that may be either natural or artificial but in which the flow is natural and continuous. These phrases are used to distinguish from the flow in various treatment tanks such as in sedimentation tanks or ponds, activated sludge tanks, filter tanks, aerating ponds, etc. These phrases with added limitations, are used to designate a water course carrying waste material, and in which course the natural process of purification found in such a water course, is at work. These phrases, when used in connection with other phrases relating to the disposal of waste material, distinguish it from "sewage treatment." "Sewage treatment" involves the retention of waste material for a period during which certain physical, biochemical, or chemical action is made to take place. These phrases denote that there is no retention.

The present process does not relate to a means substituted for the natural process of purification but relates to a process that is in direct aid to the natural process. It is not a distinct process that is carried on in a manner aggregative to the natural process but it is a process that enhances the natural process of reaeration and for that reason is called "Accelerated Reaeration." It is also a process that may be considered and used as a means for restoring the oxygen to a water course after depletion of the oxygen and after the conclusion of the natural or artificial purification of the course. This may be done solely for the preservation of the fish life.

Having thus described my invention, I claim:

1. A process of treating a natural water course into which sewage has been placed for disposal, comprising: allowing in and along such water course the dispersion of and the natural decomposition of such sewage whereby the biochemical oxygen demand of such water is, and the dissolved oxygen may be, decreased; and along the path of such dispersion, following a reduction in the dissolved oxygen, and prior to the minimum allowable dissolved oxygen, bubbling air up through such water course to maintain the dissolved oxygen in the water above the minimum allowable by law, whereby the rate of decomposition of organic material is maintained above a desired value, fish life is maintained, and nuisances are minimized.

2. A process of treating a natural water course into which sewage has been placed for disposal, comprising: allowing in and along such water course the dispersion of and the natural decomposition of such sewage whereby along the path of such dispersion the biochemical oxygen demand of, and the dissolved oxygen in, such water course decreases; and along the path of such dispersion bubbling air up through such water course to raise the amount of and to maintain the dissolved oxygen therein above the minimum allowable by law whereby the rate of decomposition of organic material is maintained above a desired value, fish life is maintained, and nuisances are minimized.

3. A process of treating a natural water course into which sewage has been placed for disposal, comprising: allowing in and along such water course the dispersion of, and the natural decomposition of such sewage whereby along the path of such dispersion the biochemical oxygen demand of, and the dissolved oxygen in, such water course decreases; and along the path of such dispersion bubbling air upwardly in such water course to increase the amount of dissolved oxygen therein, whereby fish life is maintained, and nuisances are minimized.

RICHARD G. TYLER.